(12) United States Patent
Ham et al.

(10) Patent No.: US 7,534,291 B2
(45) Date of Patent: May 19, 2009

(54) INK COMPOSITION AND INK CARTRIDGE INCLUDING THE INK COMPOSITION

(75) Inventors: Cheol Ham, Yongin-si (KR); Seung-min Ryu, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 181 days.

(21) Appl. No.: 11/701,388

(22) Filed: Feb. 2, 2007

(65) Prior Publication Data

US 2007/0289487 A1 Dec. 20, 2007

(30) Foreign Application Priority Data

Jun. 14, 2006 (KR) .................. 10-2006-0053311

(51) Int. Cl.
*C09D 11/02* (2006.01)
(52) U.S. Cl. .............. 106/31.58; 106/31.43; 106/31.59; 106/31.75; 106/31.86; 106/31.89
(58) Field of Classification Search .............. 106/31.58, 106/31.59, 31.43, 31.86, 31.89, 31.75
See application file for complete search history.

(56) References Cited

U.S. PATENT DOCUMENTS

| | | | | |
|---|---|---|---|---|
| 4,508,570 A * | 4/1985 | Fujii et al. | ................ | 106/31.58 |
| 4,750,937 A * | 6/1988 | Botros | ...................... | 106/31.58 |
| 4,853,036 A * | 8/1989 | Koike et al. | .............. | 106/31.58 |
| 4,957,553 A * | 9/1990 | Koike et al. | .............. | 106/31.58 |
| 5,116,409 A * | 5/1992 | Moffatt | .................... | 106/31.43 |
| 5,395,434 A * | 3/1995 | Tochihara et al. | ........ | 106/31.59 |
| 6,051,057 A * | 4/2000 | Yatake et al. | ............. | 106/31.58 |
| 6,153,001 A | 11/2000 | Suzuki et al. | | |
| 6,336,965 B1 | 1/2002 | Johnson et al. | | |
| 6,613,136 B1 * | 9/2003 | Arita et al. | ................ | 106/31.58 |
| 6,776,829 B2 * | 8/2004 | Miyamoto et al. | ........ | 106/31.58 |
| 7,048,789 B2 * | 5/2006 | Taguchi et al. | ........... | 106/31.43 |
| 2003/0119943 A1 | 6/2003 | Tucker et al. | | |
| 2004/0182280 A1 | 9/2004 | Koga et al. | | |
| 2004/0198869 A1 | 10/2004 | Nakamura et al. | | |
| 2007/0263058 A1 * | 11/2007 | Sao et al. | .................. | 106/31.58 |

FOREIGN PATENT DOCUMENTS

| | | |
|---|---|---|
| EP | 1 243 624 | 9/2002 |
| KR | 1994-005424 | 3/1994 |
| WO | WO 03/040242 | 5/2003 |

\* cited by examiner

*Primary Examiner*—Helene Klemanski
(74) *Attorney, Agent, or Firm*—Roylance, Abrams, Berdo & Goodman, L.L.P.

(57) ABSTRACT

An ink composition comprising a colorant, a solvent, a surfactant, and a defoaming agent is provided. The defoaming agent has a structure of Formula $$R^1-X-(CH_2CH_2O)m-(CHCH_3CH_2O)n-R^2 \quad (I),$$

in which, X is selected from the group consisting of COO, O, S, $R^3$—N and $R^4(R^5)$—C; $R^1$, $R^2$, $R^3$, $R^4$, and $R^5$ are each independently selected from the group consisting of a hydrogen atom, a substituted or unsubstituted alkyl group, a substituted or unsubstituted cycloalkyl group, a substituted or unsubstituted alkenyl group, a substituted or unsubstituted aryl group and a substituted or unsubstituted aralkyl group; m is an integer from 0 to 100; and n is a natural number from 1 to 100. The ink composition according to the exemplary embodiment exhibits low foaming properties in order to flow smoothly and has a good initial discharge capacity and less ink bleeding so that it is possible to achieve a high print quality during printing, and an ink cartridge including the same.

30 Claims, 1 Drawing Sheet

INK COMPOSITION AND INK CARTRIDGE INCLUDING THE INK COMPOSITION

CROSS-REFERENCE TO RELATED APPLICATIONS

This application claims the benefit under 35 U.S.C. §119 of Korean Patent Application No. 10-2006-0053311, filed on Jun. 14, 2006, in the Korean Intellectual Property Office, the entire disclosure of which is hereby incorporated by reference in its entirety.

BACKGROUND OF THE INVENTION

1. Field of the Invention

The present invention relates to an ink composition and an ink cartridge including the ink composition. More specifically, the present invention relates to an ink composition, which exhibits low foaming properties in order to flow smoothly and has a good initial discharge capacity and less ink bleeding so that it is possible to achieve a high print quality during printing. The invention is directed to an ink cartridge including the ink composition.

2. Description of the Related Art

An ink composition is used in order that a specific object is colored with a desired color and specifically, for forming images on paper. The ink composition is produced by dissolving a colorant in a solvent. There are various types of ink composition according to the materials or methods used in preparing the ink composition, such as an ink composition prepared by dissolving dyes in an aqueous or nonaqueous medium, an ink composition prepared by dispersing pigments in an aqueous or nonaqueous medium, or a solid ink composition capable of being melted by applying heat.

Among these, ink compositions prepared by dissolving dyes in an aqueous medium are the most commonly used at present. This type of ink composition has excellent color tone and high safety when applied to the human body and the environment. This ink composition is used, for example, in a wet-type image forming apparatus capable of easily printing in the home or office where the wet-type image forming apparatus has been widely utilized in recent years. Accordingly, it is possible to form images of a high quality similar to the quality of a silver gelatin photograph.

The ink composition may be used in a wet-type image forming apparatus. To perform high-quality image recording over a long period using an aqueous ink composition for forming images, the ink composition should have suitable viscosity, surface tension, density, or other properties.

If an inlet to the nozzle, which is the discharge port of the ink composition of a wet-type image forming apparatus, becomes clogged by used ink composition, if a precipitate is produced by heat or the like, or if the properties of the ink change during the storage of the ink composition, the quality of the image formed using the ink composition naturally deteriorates.

When the ink composition is stored for a long time in an ink storage part capable of storing a large amount of the ink composition, bubbles may be formed or dissolved in the ink composition. If the ink composition is used in this state, problems arise. In other words, since the fluidity of the storage part or the flow passage of the ink composition is inhibited, or bubbles are absorbed into a nozzle with a narrow diameter when the ink composition is ejected, it may be difficult to eject the ink composition.

Furthermore, when printing at a high speed, that is, under high frequency operating conditions, the discharge capacity of the ink composition is greatly affected by fine bubbles generated in the vicinity of the heater of the heat head, or at the tip of the nozzles and adhered to the sides of the nozzles. This effect has been increasingly discussed, because characteristics necessary for high-speed printing are important factors being demanded for the ink composition.

Therefore, it is necessary to remove the bubbles contained in the ink composition, or prevent the generation of bubbles.

Accordingly, in Japanese Patent No. 3,078,184, a method of adding a fluorine- or silicone-based polymer to the ink composition is used, in order to increase the defoaming property. However, these polymers have a low solubility in the ink composition so that a simple melting method cannot be used and a dispersing operation is performed, or there is a need to use a specific solvent having a high solubility of the polymers.

Since polymer additives and a solvent with a high solubility for the additives have insufficient miscibility with other additives forming the ink composition, there are disadvantages in that layer separation and solidification easily arise in the ink composition. Due to these disadvantages, the nozzle of the print head became clogged, which generated further problems.

U.S. Pat. No. 4,957,553 discloses that secondary alkyl alcohols having 7 or fewer carbon atoms or ethylene oxide adducts thereof, acetylene alcohol or acetylene glycol are added as a defoaming agent to the ink composition, in order to prevent ink bleeding on the paper and improve the print quality while maintaining the discharge stability of the ink composition under high frequency operating conditions.

However, the defoaming performance of the defoaming agent in the ink composition disclosed in this patent, is inadequate and phenomena arise in which the ink composition is non-uniformly spread along the fibers of the paper and the edges of the formed images are frequently feathered.

Generally, it is required that the ink composition for a wet-type image forming apparatus prevent ink bleeding on regular paper and have excellent initial discharge capacity in the flow passage of the head. Recently, the head of the wet-type image forming apparatus has been reduced in size, and a narrow and complicated flow passage is formed therein. For this reason, since there are many possibilities for bubbles to remain in a bend or gap in the flow passage, it may be difficult for the ink composition to flow through the flow passage smoothly.

To enhance the initial discharge capacity of the ink composition, a method is known in which an appropriate amount of a surfactant is added to the ink composition, and surface tension is decreased to an optimum value in order to enhance the moisture level on an inside wall of the flow passage of the ink composition of the head. However, a problem with this method is that surface tension of the ink composition decreases, and simultaneously the moisture level of the paper increases to allow the ink composition to be feathered at the edge of the formed images. In other words, it is difficult in a conventional ink composition to achieve both enhancement of the initial discharge capacity and prevention of ink bleeding on the image.

Therefore, a method is required in which miscibility with other additives is guaranteed, the ink bleeding on the image is not induced while retaining the initial discharge capacity of the ink composition, the generation of bubbles in the ink composition is inhibited, and the generated bubbles are removed.

SUMMARY OF THE INVENTION

Exemplary embodiments of the present invention address at least the above problems and/or disadvantages and provide at least the advantages described below. Accordingly, an exemplary aspect of the present invention is to provide an ink composition, which exhibits low foaming properties in order to flow smoothly and has a good initial discharge capacity and less ink bleeding so that it is possible to achieve a high print quality during printing. The invention is further directed to an ink cartridge including the ink composition.

The foregoing and other objects and advantages are substantially realized by providing an ink composition comprising a colorant, a solvent, a surfactant and a defoaming agent, wherein the defoaming agent has a structure as in Formula (I),

$$R^1—X—(CH_2CH_2O)m-(CHCH_3CH_2O)n-R^2 \quad (I)$$

in which, X is selected from the group consisting of COO, O, S, $R^3$—N and $R^4(R^5)$—C; and $R^1$, $R^2$, $R^3$, $R^4$ and $R^5$ are each independently selected from the group consisting of a hydrogen atom, a substituted or unsubstituted alkyl group, a substituted or unsubstituted cycloalkyl group, a substituted or unsubstituted alkenyl group, a substituted or unsubstituted aryl group and a substituted or unsubstituted aralkyl group. m is an integer from 0 to 100 and n is a natural number from 1 to 100. In one preferred embodiment, m is an integer from 0 to 50 and n is a natural number from 1 to 50.

In an exemplary embodiment, the colorant is either a dye or a pigment. The dye is preferably selected from the group consisting of direct dyes, acid dyes, edible dyes, alkaline dyes, reactive dyes, disperse dyes, and oily dyes. Also, the dye is preferably selected from the group consisting of azo dyes, anthraquinone dyes, indigo dyes, phthalocyanine dyes, carbonyl dyes, quinoneimine dyes, methine dyes, quinoline dyes, and nitro dyes. The pigment is an inorganic pigment selected from the group consisting of titanium oxide, iron oxide (Bengala), antimony red, cadmium red, cadmium yellow, cobalt blue, carbon black and graphite; and an azo pigment. Preferably, the colorant is contained in an amount from 0.5% by weight to 10% by weight based on the weight of the ink composition.

In an exemplary embodiment, the solvent includes either one or both water and a water-soluble or water-miscible organic solvent. A water-soluble or water-miscible organic solvent is preferably selected from the group consisting of an aliphatic monohydric alcohol, an aliphatic polyhydric alcohol and a derivative of an aliphatic polyhydric alcohol. An aliphatic monohydric alcohol is selected from the group consisting of methyl alcohol, ethyl alcohol, n-propyl alcohol, i-propyl alcohol, n-butyl alcohol, s-butyl alcohol and t-butyl alcohol. Furthermore, an aliphatic polyhydric alcohol is preferably selected from the group consisting of alkylene glycols, such as ethylene glycol, diethylene glycol, triethylene glycol, propylene glycol, butylene glycol and glycerol; polyalkylene glycols, such as polyethylene glycol and polypropylene glycol; thiodiglycols; and a mixture thereof. Additionally, the derivative of the aliphatic polyhydric alcohol is preferably selected from the group consisting of lower alkyl ethers of aliphatic polyhydric alcohols and lower carboxylic acid esters of aliphatic polyhydric alcohols.

In an exemplary embodiment, when the solvent includes water and the water-soluble organic solvent, the water-soluble organic solvent is preferably contained in an amount from about 2% by weight to about 100% by weight based on the weight of water. In addition, the water-soluble organic solvent is preferably contained in an amount from about 1% by weight to about 40% by weight based on the weight of the ink composition.

In an exemplary embodiment, the surfactant is at least one selected from the group consisting of a cationic surfactant, an anionic surfactant and a nonionic surfactant. A nonionic surfactant comprises preferably one of ethoxylated acetylenic diol, polyethylene oxide, polypropylene oxide, and polyoxyethylene sorbitan fatty acid ester.

In an exemplary embodiment, the surfactant is contained in an amount from about 0.05% by weight to about 3% by weight based on the weight of the ink composition.

In an exemplary embodiment, the defoaming agent is selected from the group consisting of polypropylene glycol fatty acid esters, polyoxyethylene polyoxypropylene alkyl ethers, polyoxyalkylene amines, and polypropylene dialkylaminoalkyl ethers.

In an exemplary embodiment, in Formula (I), $R^1$, $R^2$, $R^3$, $R^4$ and $R^5$ are a hydrocarbon group having 1 to 40 carbon atoms, the alkyl group is selected from the group consisting of a methyl group, an ethyl group, a propyl group, a butyl group, a pentyl group, a hexyl group, a heptyl group, an octyl group, a nonyl group, a decyl group, a dodecyl group, a tetradecyl group, a hexadecyl group, and an octadecyl group, the cycloalkyl group is a cyclohexyl group, the alkenyl group is either a vinyl group or an allyl group, the aryl group is selected from the group consisting of a phenyl group, a tolyl group, a naphthyl group and a biphenyl group, and the aralkyl group is either a 2-phenylethyl group or a 2-methyl-2-phenylethyl group.

In an exemplary embodiment, the defoaming agent is contained in an amount from about 3.3% by weight to about 100% by weight in the ink composition based on the weight of the ink composition.

In an exemplary embodiment, the ink composition further comprises one or more additives selected from the group consisting of a dispersant, a viscosity modifier, a pH modifier, an antiseptic and a chelating agent.

Furthermore, the foregoing and other exemplary objects and advantages are substantially realized by providing an ink cartridge including the ink composition comprising an ink storage part which stores the ink composition, and an ink ejection part which ejects the ink composition. The ink composition stored in the ink cartridge comprises a colorant, a solvent, a surfactant and a defoaming agent, wherein the defoaming agent has a structure as in Formula (I),

$$R^1—X—(CH_2CH_2O)m-(CHCH_3CH_2O)n-R^2 \quad (I)$$

in which, X is selected from the group consisting of COO, O, S, $R^3$—N and $R^4(R^5)$—C; $R^1$, $R^2$, $R^3$, $R^4$, and $R^5$ are each independently selected from the group consisting of a hydrogen atom, a substituted or unsubstituted alkyl group, a substituted or unsubstituted cycloalkyl group, a substituted or unsubstituted alkenyl group, a substituted or unsubstituted aryl group and a substituted or unsubstituted aralkyl group; m is an integer from 0 to 100; and n is a natural number from 1 to 100.

These and other aspects of the invention will become apparent from the following detailed description of the invention and the drawing which show one embodiment of the invention.

BRIEF DESCRIPTION OF THE DRAWINGS

The above aspects and features of embodiments of the present invention will become more apparent by describing certain exemplary embodiments of the present invention with reference to the accompanying drawings, in which.

DETAILED DESCRIPTION OF THE INVENTION

Figure 1:
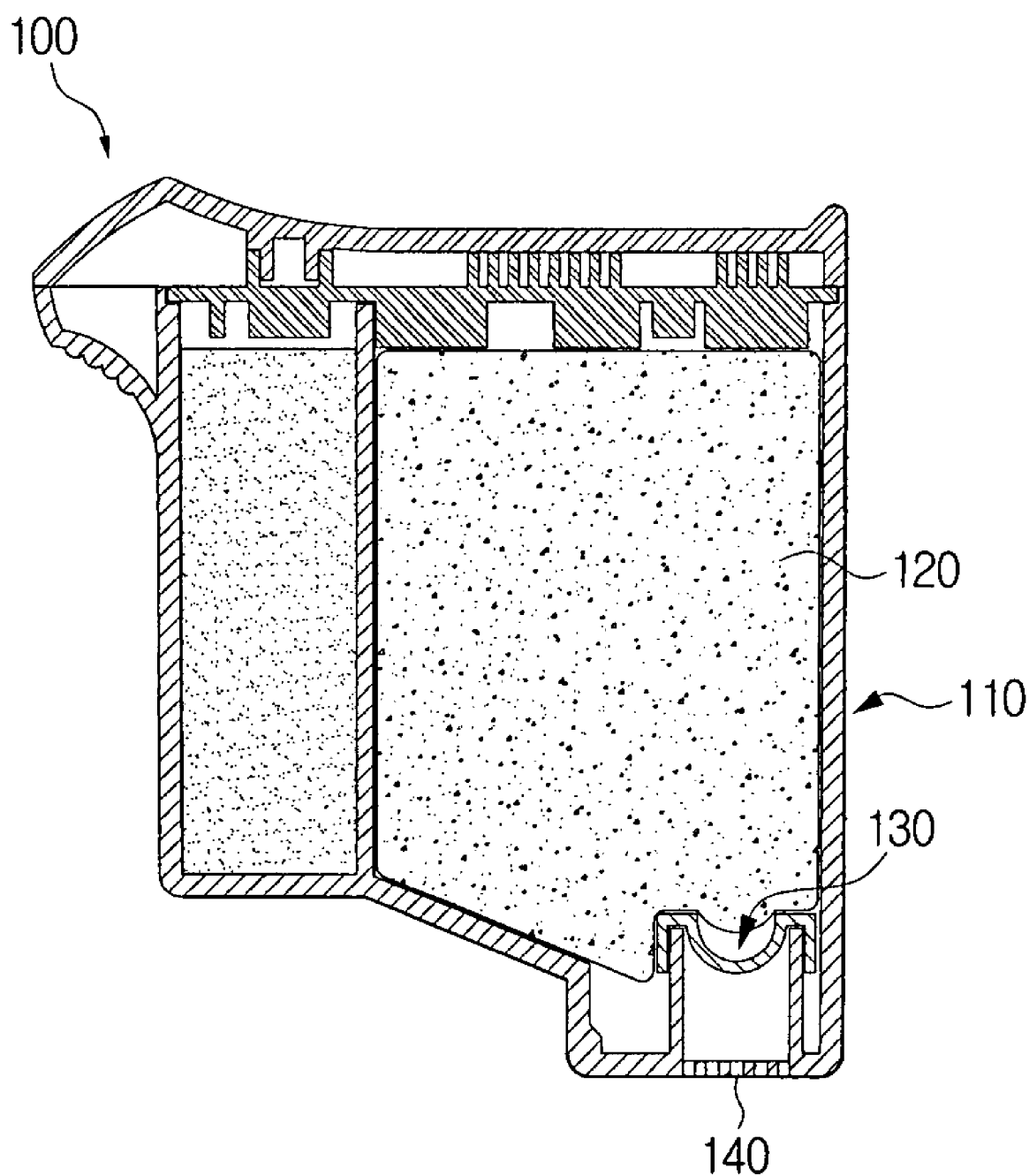
FIG. 1 is a cross-sectional view illustrating an ink cartridge which stores an ink composition according to an exemplary embodiment of the present invention.

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Hereinafter, exemplary embodiments of the present invention will be described in detail with reference to the accompanying drawing.

The ink composition according to the exemplary embodiment of the present invention comprises a colorant, a solvent, a surfactant, and a defoaming agent. The defoaming agent has a structure as in Formula (I),

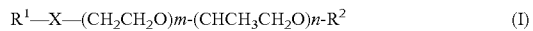

$$R^1\text{—}X\text{—}(CH_2CH_2O)m\text{-}(CHCH_3CH_2O)n\text{-}R^2 \qquad (I)$$

in which, X is selected from the group consisting of COO, O, S, $R^3$—N and $R^4(R^5)$—C; $R^1$, $R^2$, $R^3$, $R^4$ and $R^5$ are each independently selected from the group consisting of a hydrogen atom, a substituted or unsubstituted alkyl group, a substituted or unsubstituted cycloalkyl group, a substituted or unsubstituted alkenyl group, a substituted or unsubstituted aryl group and a substituted or unsubstituted aralkyl group; m is an integer from 0 to 100; and n is a natural number from 1 to 100.

Examples of the alkyl group include a methyl group, an ethyl group, a propyl group, a butyl group, a pentyl group, a hexyl group, a heptyl group, an octyl group, a nonyl group, a decyl group, a dodecyl group, a tetradecyl group, a hexadecyl group, and an octadecyl group; examples of the cycloalkyl group include a cyclohexyl group; examples of the alkenyl group include a vinyl group and an allyl group; examples of the aryl group include a phenyl group, a tolyl group, a naphthyl group and a biphenyl group; and examples of the aralkyl group include a 2-phenylethyl group and a 2-methyl-2-phenylethyl group, but the above-described examples are not particularly limited thereto.

$R^1$, $R^2$, $R^3$, $R^4$, and $R^5$ preferably have 1 to 40 carbon atoms.

Preferably, m is an integer from 0 to 100 and n is a natural number from 1 to 100, and more preferably, m is an integer from 0 to 50 and n is a natural number from 1 to 50.

The defoaming agent of Formula (I) has a single chain structure based on a polyether skeleton consisting of propylene oxide, ethylene oxide or a mixture thereof. If the defoaming agent contains a skeleton of a lipophilic component ($CHCH_3CH_2O$), the defoaming effect and penetration of the ink into paper is excellent. Accordingly, although only a small amount of the defoaming agent is added to the ink composition according to the exemplary embodiment of the present invention, the effects described above are sufficiently exhibited. Accordingly, when bubbles are generated in the flow passage of the ink composition, it is possible to rapidly remove bubbles blocking flow of the ink composition, and prevent ink bleeding on the paper.

If a hydrophilic component ($CH_2CH_2O$) is excessively increased, it becomes possible to generate bubbles in the ink composition, and if a lipophilic component ($CHCH_3CH_2O$) is excessively increased, it becomes possible to allow ink bleeding to occur. Therefore, the balance between hydrophilic and lipophilic groups is important in the compound of Formula (I).

Examples of the defoaming agent, which is the compound of Formula (I), include polypropylene glycol fatty acid ester, polyoxyethylene polyoxypropylene alkyl ethers, polyoxyalkylene amines, and polypropylene dialkylaminoalkyl ethers, but are not particularly limited thereto.

The defoaming agent of Formula (I) is preferably contained in an amount from 0.01% by weight to 3% by weight, and more preferably from 0.1% by weight to 1% by weight based on the weight of the ink composition according to the exemplary embodiment of the present invention.

When the defoaming agent of Formula (I) is contained in an amount less than 0.01% by weight in the ink composition, the defoaming effect may be insufficient and the initial discharge capacity of the ink composition may be inferior. On the other hand, when the defoaming agent of Formula (I) is contained in an amount greater than 3% by weight in the ink composition, the degree of penetration of the ink composition into the paper is greater and reaches the rear side of the paper, and thus, the problem of bleeding may be generated. Additionally, the vicinity of the nozzle ejecting the ink composition is covered with the ink composition, so that it may be difficult to eject the ink composition stably.

The colorant is either a dye or a pigment, and the dye is preferably selected from the group consisting of direct dyes, acid dyes, edible dyes, alkaline dyes, reactive dyes, disperse dyes, and oily dyes.

In addition, the dye is preferably selected from the group consisting of azo dyes, anthraquinone dyes, indigo dyes, phthalocyanine dyes, carbonyl dyes, quinoneimine dyes, methine dyes, quinoline dyes, and nitro dyes.

The pigment is either an inorganic pigment selected from the group consisting of titanium oxide, iron oxide (Bengala), antimony red, cadmium red, cadmium yellow, cobalt blue, carbon black and graphite, or an organic pigment selected from the group consisting of azo type pigments and the same type of pigments.

The content of the colorant is determined in accordance with the type of the solvent and characteristics required for the ink composition, and preferably 0.5% by weight to 10% by weight, more preferably 1% by weight to 7% by weight based on the weight of the ink composition.

The ink composition according to the exemplary embodiment of the present invention comprises a solvent or water as a dispersion medium. Water is preferably deionized water, but is not particularly limited thereto.

The content of water is preferably from 10% by weight to 98% by weight, and more preferably from 40% by weight to 95% by weight based on the weight of the ink composition. If the content of water is less than 10% by weight, there is a problem in that viscosity of the ink composition is greater, resulting in a deterioration of the discharge capacity. If the content of water is greater than 98% by weight, the surface tension of the ink composition is excessively increased to reduce the printing characteristics such as permeability into the print medium, dot-forming property and the drying performance of the printed image when printed on the print medium such as ordinary or special paper.

Preferably, the solvent includes water, a water-soluble or water-miscible organic solvent or mixture thereof.

The water-soluble or water-miscible organic solvent is preferably selected from the group consisting of an aliphatic monohydric alcohol, an aliphatic polyhydric alcohol and a derivative of the aliphatic polyhydric alcohol.

When an aliphatic monohydric alcohol is contained in the ink composition, the aliphatic monohydric alcohol can regulate surface tension of the ink composition to improve permeability into the print medium, dot-forming property and the drying performance of the printed image. Additionally, the aliphatic polyhydric alcohol and the derivative of an aliphatic polyhydric alcohol do not evaporate easily, which lowers the freezing point of the ink composition, and accordingly, improves the preservation stability of the ink composition even at low temperatures to prevent the nozzle from being clogged.

Examples of the aliphatic monohydric alcohol include methyl alcohol, ethyl alcohol, n-propyl alcohol, i-propyl alcohol, n-butyl alcohol, s-butyl alcohol and t-butyl alcohol, but are not particularly limited thereto. Preferably, the aliphatic monohydric alcohol is ethyl alcohol, i-propyl alcohol or n-butyl alcohol.

Examples of the aliphatic polyhydric alcohol include alkylene glycols, such as ethylene glycol, diethylene glycol, triethylene glycol, propylene glycol, butylene glycol and glycerol; polyalkylene glycols, such as polyethylene glycol and polypropylene glycol; thiodiglycols; and a mixture thereof, but are not particularly limited thereto.

Examples of the derivatives of the aliphatic polyhydric alcohol include lower alkyl ethers of the aliphatic polyhydric alcohol and lower carboxylic acid esters of the aliphatic polyhydric alcohol, but are not particularly limited thereto. Preferably, the lower alkyl ethers of the aliphatic polyhydric alcohol are ethylene glycol dimethyl ether, and the lower carboxylic acid esters of the aliphatic polyhydric alcohol are ethylene glycol diacetate.

When the solvent includes water and a water-soluble or water-miscible organic solvent, the water-soluble or water-miscible organic solvent is preferably contained in an amount from about 2% by weight to about 100% by weight based on the weight of water. If the weight ratio of the water-soluble or water-miscible organic solvent to water is less than 0.02, the surface tension of the ink composition is excessively increased so that permeability into the print medium, dot-forming property and the drying performance of the printed image may be reduced. If the weight ratio is 1 or more, the viscosity of the ink composition is excessively increased so that the discharge capacity of the ink composition may be reduced.

The water-soluble or water-miscible organic solvent is preferably contained in an amount from about 1% by weight to about 40% by weight based on the weight of the ink composition.

If the content of the water-soluble organic solvent is less than 1% by weight based on the total parts by weight of the ink composition, surface tension of the ink composition is excessively increased to reduce the printing characteristics such as permeability into the print medium, dot-forming property and the drying performance of the printed image when printed on a print medium such as ordinary or special paper. If the content of the water-soluble organic solvent is more than 40% by weight, the viscosity of the ink composition is excessively increased so that the discharge capacity thereof may be reduced.

The surfactant is preferably at least one selected from the group consisting of a cationic surfactant, an anionic surfactant and a nonionic surfactant. Preferably, the surfactant is a nonionic surfactant. Nonionic surfactants have excellent defoaming performance compared to other surfactants.

Examples of the nonionic surfactant include, but are not particularly limited to, the SURFYNOL series (trademark, manufactured by Air Products and Chemicals, Inc.) which have a structure of ethoxylated acetylenic diols; the TERGITOL series (trademark, manufactured by Union Carbide Corporation) which have a structure of polyethylene or polypropylene oxide; and the Tween series (trademark) which have a structure of polyoxyethylene sorbitan fatty acid esters, but are not particularly limited thereto.

Preferably, the surfactant is contained in an amount from about 0.05% by weight to about 3% by weight based on the weight of the ink composition.

The ink composition according to the exemplary embodiment of the present invention may further comprise at least one component selected from the group consisting of a dispersant, a viscosity modifier, a pH modifier, an antiseptic and a chelating agent.

The ink composition according to the exemplary embodiment of the present invention is not particularly limited to the use thereof, and may be used in a toner composition, various paints and a coating solution other than the ink cartridge for printing with the wet-type image forming apparatus.

The exemplary embodiment of the present invention provides an ink cartridge comprising an ink storage part which stores the ink composition, and an ink ejection part which ejects the ink composition.

Preferably, the ink composition stored in the ink cartridge comprises a colorant, a solvent, a surfactant, and a defoaming agent. The defoaming agent has a structure as in Formula (I),

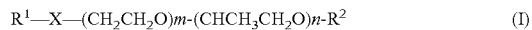

$$R^1\text{—}X\text{—}(CH_2CH_2O)m\text{-}(CHCH_3CH_2O)n\text{-}R^2 \quad (I)$$

in which, X is selected from the group consisting of COO, O, S, $R^3$—N and $R^4(R^5)$—C; $R^1$, $R^2$, $R^3$, $R^4$, and $R^5$ are each independently selected from the group consisting of a hydrogen atom, a substituted or unsubstituted alkyl group, a substituted or unsubstituted cycloalkyl group, a substituted or unsubstituted alkenyl group, a substituted or unsubstituted aryl group and a substituted or unsubstituted aralkyl group; m is an integer from 0 to 100; and n is a natural number from 1 to 100.

FIG. 1 is a cross-sectional view illustrating an ink cartridge 100 which stores an ink composition 120 according to the exemplary embodiment of the present invention.

Referring to FIG. 1, the cartridge 100 includes the ink composition 120 in an ink storage part 110.

The ink storage part 110 stores the ink composition 120. A filter 130 included in a lower part of the ink storage part 110 filters impurities in the ink composition and fine bubbles to prevent an ink ejection part 140 from being clogged. When the ink composition is passed through the filter 130, the ink ejection part 140 ejects the ink composition to the outside.

The ink composition 120 stored in the ink storage part 110 passes through the filter 130 when the image forming apparatus is operated. The ink composition 120 passes through the ink ejection part 140, and is then ejected onto the print medium in droplet form.

The ink cartridge 100 according to the exemplary embodiment of the present invention is preferably used in a wet-type image forming apparatus with an array head. In contrast to a shuttle-type image forming apparatus in which one chip is transferred to be printed, high-speed printing is performed by using a plurality of chips in the wet-type image forming apparatus with the array head, so that the amount of a recording apparatus to be processed may be increased. Since the wet-type image forming apparatus with the array head has a plurality of ink ejection parts 140, the ink composition 120 with a low foaming property according to the exemplary embodiment of the present invention is used to more effectively prevent the ink ejection part 140 from being clogged. Therefore, it is possible to efficiently form images of a high quality at a high speed.

EXAMPLES

An ink composition according to the exemplary embodiment of the present invention is prepared in the following method.

To a solvent, were mixed a colorant, a surfactant and a defoaming agent according to the exemplary embodiment of the present invention with other additives, and then the mixture was sufficiently stirred by a stirrer until homogeneous. The resulting mixture is filtered through a filter to obtain the ink composition according to the exemplary embodiment of the present invention.

In Examples 1 to 5, the ink composition according to the exemplary embodiment of the present invention is prepared in accordance with the preparation method described above, based on the content of the following raw materials.

| | | Content |
|---|---|---|
| Example 1 | | |
| Colorant: | C.I. Basic Black 2 | 5 parts by weight |
| Organic solvent: | glycerol | 2 parts by weight |
| | diethylene glycol | 3 parts by weight |
| Surfactant: | nonionic surfactant (trademark: Surfynol 440, manufactured by Air Products and Chemicals, Inc.) | 0.5 part by weight |
| Defoaming agent: | polypropyleneglycol stearate (trademark: PMS-SE, manufactured by Nikko Chemicals Co., Ltd.) | 0.1 part by weight |
| Deionized water | | remainder |
| Example 2 | | |
| Colorant: | C.I. Direct Yellow 44 | 3 parts by weight |
| Organic solvent: | glycerol | 3 parts by weight |
| | diethylene glycol | 2 parts by weight |
| | ethylene glycol | 2 parts by weight |
| Surfactant: | nonionic surfactant (trademark: Tween 20, manufactured by Aldrich Chemical Co.) | 0.4 part by weight |
| Defoaming agent: | polyoxyethylene polyoxypropylene alkyl ether (trademark: PBC-31, manufactured by Nikko Chemicals Co., Ltd.) | 0.1 part by weight |
| Deionized water | | remainder |
| Example 3 | | |
| Colorant: | C.I. Basic Blue 26 | 2 parts by weight |
| Organic solvent: | diethylene glycol | 3 parts by weight |
| | ethylene glycol | 4 parts by weight |
| Surfactant: | nonionic surfactant (trademark: Surfynol 465, manufactured by Air Products and Chemicals, Inc.) | 0.3 part by weight |

-continued

| | | Content |
|---|---|---|
| Defoaming agent: | polyoxyalkylene amine (trademark: Surfonamine B-200, manufactured by Huntsman Corporation) | 0.05 part by weight |
| Deionized water | | remainder |
| Example 4 | | |
| Colorant: | C.I. Direct Red 227 | 3 parts by weight |
| Organic solvent: | glycerol | 3 parts by weight |
| | diethylene glycol | 2 parts by weight |
| | Ethylene glycol | 4 parts by weight |
| Surfactant: | nonionic surfactant (trademark: Tween 40, manufactured by Aldrich Chemical Co.) | 0.6 part by weight |
| Defoaming agent: | polypropylene dialkylaminoalkyl ether (trademark: Solsperse 20000, manufactured by Noveon Inc.) | 0.2 part by weight |
| Deionized water | | remainder |
| Example 5 | | |
| Colorant: | Carbon Black (trademark: FW 200, manufactured by Degussa AG) | 6 parts by weight |
| Dispersant: | acrylate dispersant (trademark: Joncryl 61, manufactured by Johnson Polymer Corporation) | 5 parts by weight |
| Organic solvent: | glycerol | 3 parts by weight |
| | diethylene glycol | 4 parts by weight |
| | ethylene glycol | 4 parts by weight |
| Surfactant: | nonionic surfactant (trademark: Tergitol NP-30, manufactured by Union Carbide Corporation) | 0.3 part by weight |
| Defoaming agent: | polypropylene dialkylaminoalkyl ether (trademark: Solsperse 20000, manufactured by Noveon Inc.) | 0.05 part by weight |
| Deionized water | | remainder |

COMPARATIVE EXAMPLE

In Comparative Examples 1 to 5, the ink composition according to the exemplary embodiment of the present invention is prepared in accordance with the preparation method as described above, based on the content of the following raw materials. Comparative Examples, in which a conventional defoaming agent is used as the defoaming agent or the defoaming agent was not used, are distinct from Examples in which the defoaming agent according to the exemplary embodiment of the present invention is used as the defoaming agent.

| | | Content |
|---|---|---|
| Comparative Example 1 | | |
| Colorant: | C.I. Basic Black 2 | 5 parts by weight |
| Organic solvent: | glycerol | 2 parts by weight |
| | diethylene glycol | 3 parts by weight |
| Surfactant: | nonionic surfactant (trademark: Surfynol 440, manufactured by Air Products and Chemicals, Inc.) | 0.5 part by weight |
| Defoaming agent: | acetylene glycol | 0.1 part by weight |

-continued

| | Content | |
|---|---|---|
| | (trademark: Surfynol 104, manufactured by Air Products and Chemicals, Inc.) | |
| Deionized water | | remainder |

Comparative Example 2

| | | |
|---|---|---|
| Colorant: | C.I. Direct Yellow 44 | 3 parts by weight |
| Organic solvent: | glycerol | 3 parts by weight |
| | diethylene glycol | 2 parts by weight |
| | ethylene glycol | 2 parts by weight |
| Surfactant: | nonionic surfactant (trademark: Tween 20, manufactured by Aldrich Chemical Co.) | 0.4 part by weight |
| Defoaming agent: | ethylene oxide adducts (trademark: Nikkol BT-9, manufactured by Nikko Chemicals Co., Ltd.) | 0.1 parts by weight |
| Deionized water | | remainder |

Comparative Example 3

| | | |
|---|---|---|
| Colorant: | C.I. Basic Blue 26 | 2 parts by weight |
| Organic solvent: | diethylene glycol | 3 parts by weight |
| | ethylene glycol | 4 parts by weight |
| Surfactant: | nonionic surfactant (trademark: Surfynol 465, manufactured by Air Products and Chemicals, Inc.) | 0.3 part by weight |
| Deionized water | | remainder |

Comparative Example 4

| | | |
|---|---|---|
| Colorant: | C.I. Direct Red 227 | 3 parts by weight |
| Organic solvent: | glycerol | 3 parts by weight |
| | diethylene glycol | 2 parts by weight |
| | ethylene glycol | 4 parts by weight |
| Surfactant: | nonionic surfactant (trademark: Tween 40, manufactured by Aldrich Chemical Co.) | 0.6 part by weight |
| Deionized water | | remainder |

Comparative Example 5

| | | |
|---|---|---|
| Colorant: | Carbon Black (trademark: FW 200, manufactured by Degussa AG) | 6 parts by weight |
| Dispersant: | acrylate dispersant (trademark: Joncryl 61, manufactured by Johnson Polymer Corporation) | 5 parts by weight |
| Organic solvent: | glycerol | 3 parts by weight |
| | diethylene glycol | 4 parts by weight |
| | ethylene glycol | 4 parts by weight |
| Surfactant: | nonionic surfactant (trademark: Tergitol NP-30, manufactured by Union Carbide Corporation) | 0.3 part by weight |
| Deionized water | | remainder |

Evaluation Experiment

In the following experiment, the bubble height ratio, as an index of a defoaming property which is not affected by the degree of bubble generation, was calculated using the following Equation, $$\text{bubble height ratio } (\%) = (H/H_o) \times 100 \quad \text{[Equation 1]}$$

in which, H is the height of bubbles at 5 minutes after bubble generation, and $H_o$ is the height of bubbles at 20 seconds after bubble generation.

If the contact angle between the ink flow passage forming material and the aqueous ink composition is low, the initial discharge capacity of the ink composition into a printer head is excellent. The contact angle is generally related to the surface tension of the aqueous ink composition. To obtain good initial discharge capacity, the surface tension of the ink composition is 40 mN/m or less and the bubble height ratio (the height at 5 minutes/height at 20 seconds after bubble generation) is 0.3 or less. At this time, in the aqueous ink composition with the defoaming property, there is a large difference between the height of bubbles at 5 minutes and the height of bubbles at 20 seconds after bubble generation.

Each ink composition prepared in Examples 1 to 5 and Comparative Examples 1 to 5 is mounted in a wet-type image forming apparatus having a heater element, and ejected onto ordinary paper to evaluate discharge stability of the ink composition and the bleeding of the ink composition according to the following method.

Evaluation of Discharge Stability of Ink Composition

After an ink cartridge was changed, the nozzle purge pattern of a printer main body was printed three times to evaluate the ratio of discharge nozzles to the total number of the nozzles, based on the following reference.

<Evaluation Reference>

◎—the ratio of discharge nozzles to the total number of nozzles is 100%

○—the ratio of discharge nozzles to the total number of nozzles is 95% or more

Δ—the ratio of discharge nozzles to the total number of nozzles is 90% or more x—the ratio of discharge nozzles to the total number of nozzles is less than 90%

Evaluation of Bleeding of Ink Composition

An image sample consisting of characters in a single color mode was printed on ordinary paper (Premium Copy (trademark) paper, manufactured by Samsung Electronics Co., Ltd.). The printed characters were typed using MS Word 2002 (trademark), and the size of the characters was set to 11 point. The ink bleeding on the image sample was evaluated by the degree of bleeding in a line recorded by the aqueous ink composition, and by the clarity of the characters, based on the following reference.

<Evaluation Reference>

◎—Almost no bleeding occurs, with clear characters.

○—Slight bleeding occurs, but characters are sufficiently legible.

Δ—Bleeding occurs, but characters are generally legible.

x—Bleeding occurs, and characters are illegible.

Results

For each ink composition of Examples 1 to 5 and Comparative Examples 1 to 5, Table 1 shows the results of the evaluation of surface tension, the bubble height ratio, discharge stability of the ink composition and bleeding of the ink composition.

TABLE 1

| Items | Surface tension (mN/m) | $H_o$ (mm) | H (mm) | $H/H_o$ (%) | Discharge stability | Ink bleeding |
|---|---|---|---|---|---|---|
| Example 1 | 35 | 19 | 3 | 0.16 | ◎ | ◎ |
| Example 2 | 36 | 20 | 4 | 0.2 | ◎ | ◎ |
| Example 3 | 35 | 20 | 3 | 0.15 | ◎ | ◎ |
| Example 4 | 34 | 18 | 2 | 0.11 | ◎ | ◎ |
| Example 5 | 36 | 19 | 3 | 0.16 | ○ | ◎ |
| Comparative Example 1 | 35 | 19 | 2 | 0.11 | X | Δ |
| Comparative Example 2 | 35 | 26 | 13 | 0.5 | Δ | ○ |
| Comparative | 37 | 24 | 17 | 0.71 | Δ | X |

TABLE 1-continued

| Items | Surface tension (mN/m) | $H_o$ (mm) | H (mm) | $H/H_o$ (%) | Discharge stability | Ink bleeding |
|---|---|---|---|---|---|---|
| Example 3 Comparative Example 4 | 36 | 28 | 24 | 0.86 | X | ◎ |
| Comparative Example 5 | 36 | 27 | 27 | 0.78 | ○ | Δ |

It is clear that the ink compositions of Examples 1 to 5 containing the compound of Formula (I) of the present invention as the defoaming agent are excellent in maintaining discharge stability and preventing ink bleeding when images are formed using the wet-type image forming apparatus.

The ink compositions of Comparative Examples 1 and 2, in which another defoaming agent is used instead of the compound of Formula (I) of the present invention, and Comparative Examples 3 to 5, in which a defoaming agent was not used at all, have poor discharge stability and ink bleeding compared to the results shown in Examples 1 to 5.

In particular, it can be seen that the ink composition of Comparative Examples 2 and 4 is excellent in reducing ink bleeding, but poor in maintaining discharge stability, whereas, the ink composition of Comparative Example 5 is excellent in discharge stability, but poor in ink bleeding.

The ink composition according to the exemplary embodiment of the present invention exhibits low foaming properties to have superior fluidity. When the ink composition is used in a wet-type image forming apparatus, the initial discharge capacity is improved and ink bleeding on paper is reduced, so that it is possible to achieve a high print quality.

The ink cartridge including the ink composition according to the exemplary embodiment of the present invention is used in a wet-type image forming apparatus with the array head, and includes a plurality of heads to remove bubbles in the ink ejection part of the head or inhibit the generation of bubbles, and thus, it is possible to efficiently form images with a high quality at a high speed. Additionally, the wet-type image forming apparatus can be used more effectively by preventing the array head from being clogged.

As aforementioned, the exemplary embodiments of the present invention are shown and described, but the present invention is not limited to the specific embodiments described above, and can be implemented in various modifications by those skilled in the art to which the present invention pertains without departing from the scope of the invention as defined by the appended claims and the full scope of equivalents thereof.

What is claimed is:

1. An ink composition comprising a colorant, a solvent, a surfactant, and a defoaming agent, wherein the defoaming agent has a structure as in Formula (I), $$R^1-X-(CH_2CH_2O)m-(CHCH_3CH_2O)n-R^2 \quad (I)$$

in which, X is selected from the group consisting of COO, S, $R^3$—N and $R^4(R^5)$—C; $R^1$, $R^2$, $R^3$, $R^4$, and $R^5$ are each independently selected from the group consisting of a hydrogen atom, a substituted or unsubstituted alkyl group, a substituted or unsubstituted cycloalkyl group, a substituted or unsubstituted alkenyl group, a substituted or unsubstituted aryl group and a substituted or unsubstituted aralkyl group;

m is an integer from 0 to 100; and n is a natural number from 1 to 100.

2. The ink composition as claimed in claim 1, wherein m is an integer from 0 to 50 and n is a natural number from 1 to 50.

3. The ink composition as claimed in claim 1, wherein the colorant is either a dye or a pigment.

4. The ink composition as claimed in claim 3, wherein the dye is selected from the group consisting of direct dyes, acid dyes, edible dyes, alkaline dyes, reactive dyes, disperse dyes, and oily dyes.

5. The ink composition as claimed in claim 3, wherein the dye is selected from the group consisting of azo dyes, anthraquinone dyes, indigo dyes, phthalocyanine dyes, carbonyl dyes, quinoneimine dyes, methine dyes, quinoline dyes, and nitro dyes.

6. The ink composition as claimed in claim 3, wherein the pigment is an inorganic pigment selected from the group consisting of titanium oxide, iron oxide (Bengala), antimony red, cadmium red, cadmium yellow, cobalt blue, carbon black and graphite, or an organic pigment selected from the group consisting of azo pigments.

7. The ink composition as claimed in claim 1, wherein the colorant is contained in an amount from about 0.5% by weight to about 10% by weight based on the weight of the ink composition.

8. The ink composition as claimed in claim 1, wherein the solvent is selected from the group consisting of water, a water-soluble or water-miscible organic solvent and mixtures thereof.

9. The ink composition as claimed in claim 8, wherein the water-soluble or water-miscible organic solvent is selected from the group consisting of an aliphatic monohydric alcohol, an aliphatic polyhydric alcohol and a derivative of the aliphatic polyhydric alcohol.

10. The ink composition as claimed in claim 9, wherein the aliphatic monohydric alcohol is selected from the group consisting of methyl alcohol, ethyl alcohol, n-propyl alcohol, i-propyl alcohol, n-butyl alcohol, s-butyl alcohol and t-butyl alcohol.

11. The ink composition as claimed in claim 9, wherein the aliphatic polyhydric alcohol is selected from the group consisting of alkylene glycols, polyalkylene glycols, thiodiglycols; and mixtures thereof.

12. The ink composition as claimed in claim 11, wherein said alkylene glycol is selected from the group consisting of ethylene glycol, diethylene glycol, triethylene glycol, propylene glycol, butylene glycol and glycerol.

13. The ink composition as claimed in claim 11, wherein said polyalkylene glycol is selected from the group consisting of polyethylene glycol and polypropylene glycol.

14. The ink composition as claimed in claim 9, wherein the derivative of the aliphatic polyhydric alcohol is selected from the group consisting of lower alkyl ethers of aliphatic polyhydric alcohols and lower carboxylic acid esters of aliphatic polyhydric alcohols.

15. The ink composition as claimed in claim 8, wherein the water-soluble organic solvent is contained in an amount from about 1% by weight to about 40% by weight based on the weight of the ink composition.

16. The ink composition as claimed in claim 8, wherein the solvent contains water and water-soluble organic solvent, and where the water-soluble organic solvent is contained in an amount from about 2% by weight to about 100% by weight based on the weight of the water.

17. The ink composition as claimed in claim 1, wherein the surfactant is at least one selected from the group consisting of a cationic surfactant, an anionic surfactant and a nonionic surfactant.

18. The ink composition as claimed in claim 17, wherein the nonionic surfactant comprises one of ethoxylated acetylenic diol, polyethylene oxide, polypropylene oxide, and polyoxyethylene sorbitan fatty acid ester.

19. The ink composition as claimed in claim 1, wherein the surfactant is included in an amount of about 0.05% by weight to about 3% by weight based on the weight of the ink composition.

20. The ink composition as claimed in claim 1, wherein the defoaming agent is selected from the group consisting of polypropylene glycol fatty acid esters, polyoxyalkylene amines, and polypropylene dialkylaminoalkyl ethers.

21. The ink composition as claimed in claim 1, wherein in Formula (I), $R^1$, $R^2$, $R^3$, $R^4$, and $R^5$ are hydrocarbon groups having 1 to 40 carbon atoms.

22. The ink composition as claimed in claim 1, wherein the alkyl group is selected from the group consisting of a methyl group, an ethyl group, a propyl group, a butyl group, a pentyl group, a hexyl group, a heptyl group, an octyl group, a nonyl group, a decyl group, a dodecyl group, a tetradecyl group, a hexadecyl group, and an octadecyl group.

23. The ink composition as claimed in claim 1, wherein the cycloalkyl group is a cyclohexyl group.

24. The ink composition as claimed in claim 1, wherein the alkenyl group is a vinyl group or an allyl group.

25. The ink composition as claimed in claim 1, wherein the aryl group is selected from the group consisting of a phenyl group, a tolyl group, a naphthyl group, and a biphenyl group.

26. The ink composition as claimed in claim 1, wherein the aralkyl group is either a 2-phenylethyl group or a 2-methyl-2-phenylethyl group.

27. The ink composition as claimed in claim 1, wherein the defoaming agent is contained in an amount from about 0.01% by weight to about 3% by weight based on the weight of the ink composition.

28. The ink composition as claimed in claim 1, further comprising at least one additive selected from the group consisting of a dispersant, a viscosity modifier, a pH modifier, an antiseptic and a chelating agent.

29. An ink cartridge comprising:
an ink storage part which stores an ink composition; and
an ink ejection part which ejects the ink composition,
wherein the ink composition comprises a colorant, a solvent, a surfactant, and a defoaming agent, in which the defoaming, agent has a structure as in Formula (I),

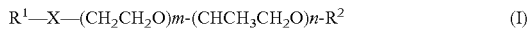

in which, X is selected from the group consisting of COO, S, $R^3$—N and $R^4(R^5)$—C;
$R^1$, $R^2$, $R^3$, $R^4$, and $R^5$ are each independently selected from the group consisting of a hydrogen atom, a substituted or unsubstituted alkyl group, a substituted or unsubstituted cycloalkyl group, a substituted or unsubstituted alkenyl group, a substituted or unsubstituted aryl group and a substituted or unsubstituted aralkyl group;
m is an integer from 0 to 100; and
n is a natural number from 1 to 100.

30. An ink composition comprising a colorant, a solvent, a surfactant, and a defoaming agent, wherein the defoaming agent has a structure as in Formula (I),

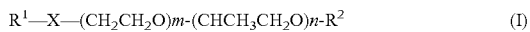

in which, X is selected from the group consisting of COO, O, S, $R^3$—N and $R^4(R^5)$—C; $R^1$, $R^2$, $R^3$, $R^4$, and $R^5$ are each independently selected from the group consisting of a substituted or unsubstituted alkyl group, a substituted or unsubstituted cycloalkyl group, a substituted or unsubstituted alkenyl group, a substituted or unsubstituted aryl group and a substituted or unsubstituted aralkyl group;
m is an integer from 0 to 100; and
n is a natural number from 1 to 100.

* * * * *